(12) United States Patent
Li

(10) Patent No.: US 12,457,076 B2
(45) Date of Patent: Oct. 28, 2025

(54) SRS RESOURCE CONFIGURATION METHOD, SRS RESOURCE DETERMINATION METHOD, AND APPARATUSES

(71) Applicant: Beijing Xiaomi Mobile Software Co., Ltd., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 446 days.

(21) Appl. No.: 17/999,344

(22) PCT Filed: May 22, 2020

(86) PCT No.: PCT/CN2020/091904
§ 371 (c)(1),
(2) Date: Nov. 18, 2022

(87) PCT Pub. No.: WO2021/232429
PCT Pub. Date: Nov. 25, 2021

(65) Prior Publication Data
US 2023/0208589 A1    Jun. 29, 2023

(51) Int. Cl.
*H04W 16/28* (2009.01)
*H04L 5/00* (2006.01)

(52) U.S. Cl.
CPC .......... *H04L 5/0051* (2013.01); *H04W 16/28* (2013.01)

(58) Field of Classification Search
CPC .............................. H04L 5/0051; H04W 16/28
See application file for complete search history.

(56) References Cited

U.S. PATENT DOCUMENTS

| 2012/0014349 A1* | 1/2012 | Chung | H04W 72/0453 |
| | | | 370/329 |
| 2018/0227094 A1 | 8/2018 | Liu et al. | |
| 2019/0239092 A1* | 8/2019 | Zhou | H04W 72/0453 |

(Continued)

FOREIGN PATENT DOCUMENTS

| CN | 109417717 A | 3/2019 |
| CN | 109792282 A | 5/2019 |

(Continued)

OTHER PUBLICATIONS

"Discussion on non-codebook based transmission for UL," Proceedings of the 3GPP TSG RAN WG1 Meeting#88bis, R1-1704874, LG Electronics, Apr. 3, 2017, Spokane, Washington, 5 pages.

(Continued)

*Primary Examiner* — Fahmida S Chowdhury
(74) *Attorney, Agent, or Firm* — McCoy Russell LLP

(57) ABSTRACT

A sounding reference signal (SRS) resource configuration method, can include: sending configuration information to a terminal, where the configuration information is used to indicate at least one SRS resource set, and each of the SRS resource sets contains at least one SRS resource; the configuration information is further used to indicate an antenna port identifier of at least one antenna port for sending each of the SRS resources, and a sending beam direction corresponding to each of the at least one antenna port identifier, and different antenna port identifiers correspond to different sending beam directions.

20 Claims, 13 Drawing Sheets

Receive configuration information sent by a network device, where the configuration information is used to indicate at least one sounding reference signal (SRS) resource set, and each of the SRS resource sets contains at least one SRS resource; the configuration information is further used to indicate an antenna port identifier of at least one antenna port for sending each of SRS resources, and a sending beam direction corresponding to each of at least one antenna port identifier, and different antenna port identifiers correspond to different sending beam directions — S201

Determine a sending beam direction for each of the antenna ports to send the SRS resource according to the configuration information — S202

(56) References Cited

U.S. PATENT DOCUMENTS

| | | | |
|---|---|---|---|
| 2019/0280835 A1* | 9/2019 | Määttänen et al. | H04L 5/0053 |
| 2019/0327717 A1* | 10/2019 | Li | H04L 5/0053 |
| 2020/0052853 A1* | 2/2020 | Qin | H04L 5/0094 |
| 2020/0083939 A1* | 3/2020 | Park | H04L 25/0226 |
| 2020/0127786 A1* | 4/2020 | Kwak | H04L 5/0026 |
| 2020/0220680 A1* | 7/2020 | Yamada | H04W 72/23 |
| 2020/0274668 A1* | 8/2020 | Yamada | H04L 41/0806 |
| 2020/0336355 A1* | 10/2020 | Yamada | H04B 7/0456 |
| 2020/0389885 A1* | 12/2020 | Tomeba | H04W 72/21 |
| 2021/0045076 A1* | 2/2021 | Tomeba | H04W 56/001 |
| 2021/0091827 A1* | 3/2021 | Namba | H04B 17/309 |
| 2021/0337496 A1* | 10/2021 | Da | H04W 24/10 |
| 2022/0060297 A1* | 2/2022 | Tomeba | H04B 7/063 |
| 2022/0201672 A1* | 6/2022 | Tomeba | H04W 16/28 |
| 2023/0033910 A1* | 2/2023 | Khoshnevisan | H04W 72/23 |
| 2023/0208589 A1* | 6/2023 | Li | H04B 7/0695 |
| | | | 370/329 |
| 2023/0208590 A1* | 6/2023 | Li | H04L 5/0048 |
| | | | 370/329 |

FOREIGN PATENT DOCUMENTS

| | | |
|---|---|---|
| CN | 110235496 A | 9/2019 |
| CN | 110858775 A | 3/2020 |
| EP | 3454474 A1 | 3/2019 |
| WO | 2019066560 A1 | 4/2019 |
| WO | 2019197044 A1 | 10/2019 |
| WO | 2020010632 A1 | 1/2020 |
| WO | 2020034443 A1 | 2/2020 |
| WO | 2020037207 A1 | 2/2020 |

OTHER PUBLICATIONS

"On SRS design and related operations," Proceedings of the 3GPP TSG RAN WG1 Meeting #89, LG Electronics, R1-1707618, May 15, 2017, Hangzhou, China, 6 pages.

"Enabling full TX power UL transmission for SRS," Proceedings of the 3GPP TSG-RAN WG1 Meeting #94bis, Ericsson, R1-1811547, Oct. 8, 2018, Chengdu, China, 8 pages.

"Enhancements on UE multi-beam operation," Proceedings of the 3GPP TSG RAN WG1 Meeting #97, Fraunhofer IIS, Fraunhofer HHI, R1-1907052, May 13, 2019, Reno, Nevada, 6 pages.

* cited by examiner

Send configuration information to a terminal, where the configuration information is used to indicate at least one sounding reference signal (SRS) resource set, and each of the SRS resource sets contains at least one SRS resource; the configuration information is further used to indicate an antenna port identifier of at least one antenna port for sending each of the SRS resources, and a sending beam direction corresponding to each of the at least one antenna port identifier, and different antenna port identifiers correspond to different sending beam directions ~S101

FIG. 1

SRS RESOURCE CONFIGURATION METHOD, SRS RESOURCE DETERMINATION METHOD, AND APPARATUSES

CROSS REFERENCE TO RELATED APPLICATIONS

The present application is a U.S. National Phase of International Application No. PCT/CN2020/091904 entitled "SRS RESOURCE CONFIGURATION METHOD, SRS RESOURCE DETERMINATION METHOD, AND DEVICES," and filed on May 22, 2020. The entire contents of the above-listed application are hereby incorporated by reference for all purposes.

BACKGROUND

In a 5G new radio (NR), a base station can communicate with a terminal in a beam scanning manner, and in order to determine downlink channel state information based on an SRS sent by the terminal, not only an SRS time frequency code domain resource needs to be indicated to the terminal, but also a sending beam direction of an SRS sequence sent by the terminal needs to be indicated.

SUMMARY

The present disclosure relates to the field of communication technologies, and in particular, to an SRS resource configuration method, an SRS resource configuration apparatus, an SRS resource determination method, an SRS resource determination apparatus, an electronic device, and a computer-readable storage medium.

The embodiments of the present disclosure provide an SRS resource configuration method, an SRS resource configuration apparatus, an SRS resource determination method, an SRS resource determination apparatus, an electronic device, and a computer-readable storage medium to solve the technical problems in the related art.

According to a first aspect of an embodiment of the present disclosure, there is provided an SRS resource configuration method, applicable to a network device, the method including:

sending configuration information to a terminal, where the configuration information is used to indicate at least one sounding reference signal (SRS) resource set, and each of the SRS resource sets contains at least one SRS resource;

the configuration information is further used to indicate an antenna port identifier of at least one antenna port for sending each of the SRS resources, and a sending beam direction corresponding to each of the at least one antenna port identifier, and different antenna port identifiers correspond to different sending beam directions.

According to a second aspect of an embodiment of the present disclosure, there is provided an SRS resource determination method, applicable to a terminal, and the terminal includes at least one antenna port, the method including:

receiving configuration information sent by a network device, where the configuration information is used to indicate at least one SRS resource set, and each of the SRS resource sets contains at least one SRS resource;

the configuration information is further used to indicate an antenna port identifier of at least one antenna port for sending each of the SRS resources, and a sending beam direction corresponding to each of the at least one antenna port identifier, and different antenna port identifiers correspond to different sending beam directions; and determining a sending beam direction for each of the antenna ports to send the SRS resource according to the configuration information.

According to a third aspect of an embodiment of the present disclosure, there is provided an electronic device, including:

a processor; and a memory for storing processor-executable instructions, where the processor is configured to implement the SRS resource configuration method according to any one of the foregoing embodiments.

According to a fourth aspect of an embodiment of the present disclosure, there is provided an electronic device, including:

a processor; and a memory for storing processor-executable instructions, where the processor is configured to implement the SRS resource determination method according to any one of the foregoing embodiments.

According to a fifth aspect of an embodiment of the present disclosure, there is provided a computer-readable storage medium storing a computer program, and when the program is executed by a processor, the steps of the SRS resource configuration method according to any one of the foregoing embodiments are implemented.

According to a sixth aspect of an embodiment of the present disclosure, there is provided a computer-readable storage medium storing a computer program, and when the program is executed by a processor, the steps of the SRS resource determination method according to any one of the foregoing embodiments are implemented.

BRIEF DESCRIPTION OF THE DRAWINGS

In order to describe the technical solutions in the embodiments of the present disclosure more clearly, the following briefly introduces the accompanying drawings required for describing the embodiments. Apparently, the accompanying drawings in the following description show only some embodiments of the disclosure, and those of ordinary skill in the art may still derive other drawings from these drawings without any creative efforts.

FIG. 1 is a schematic flowchart of an SRS resource configuration method according to an embodiment of the present disclosure;

DETAILED DESCRIPTION

Figure 2:
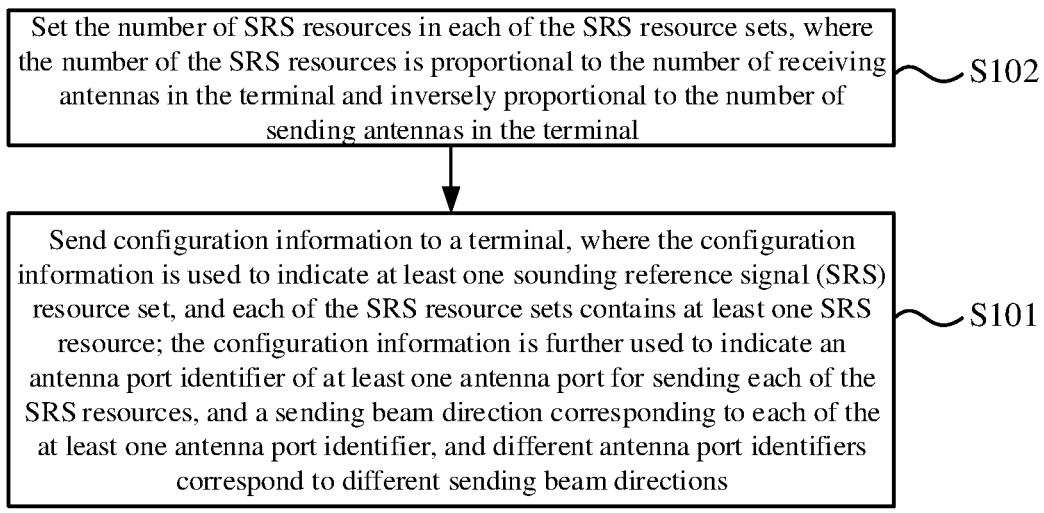
FIG. 2 is a schematic flowchart of another SRS resource configuration method according to an embodiment of the present disclosure.

The technical solutions in the embodiments of the present disclosure will be clearly and completely described below with reference to the accompanying drawings in the embodiments of the disclosure. Apparently, the embodiments described are only some of the embodiments of the disclosure, not all of them. All other embodiments obtained by those of ordinary skill in the art based on the embodiments of the disclosure without any creative efforts shall fall within the protection scope of the present disclosure.

In a 5G new radio (NR), a base station can communicate with a terminal in a beam scanning manner, and in order to determine downlink channel state information based on an SRS sent by the terminal, not only an SRS time frequency code domain resource needs to be indicated to the terminal, but also a sending beam direction of an SRS sequence sent by the terminal needs to be indicated.

In the related art, one SRS resource is configured with one sending beam direction, that is, all the antenna ports used for sending the SRS sequence use the same sending beam direction, but this is not conducive to the base station accurately determining the downlink channel state information based on a received SRS.

FIG. 1 is a schematic flowchart of an SRS resource configuration method according to an embodiment of the present disclosure. The SRS resource configuration method shown in this embodiment can be applicable to a network device, and the network device can be a 5G base station, a 4G base station, a roadside unit in Internet of Vehicles communication, a vehicle-mounted device terminal, etc. The network device can communicate with a terminal based on a beam scanning manner, and can further communicate with a terminal based on other manners, where the terminal includes, but is not limited to, an electronic device, such as a mobile phone, a tablet computer, a wearable device, an Internet of Things device terminal, an industrial Internet of Things device terminal, and an vehicle-mounted device terminal in Internet of Vehicles communication. At least one antenna panel may be provided in the terminal, and at least one antenna port may be provided on the antenna panel, and the antenna port may be a port of an antenna in a logical concept or a physical antenna in an actual concept.

As shown in FIG. 1, the SRS resource configuration method may include the following steps:

step S101: sending configuration information to a terminal, where the configuration information is used to indicate at least one sounding reference signal (SRS) resource set, and each of the SRS resource sets contains at least one SRS resource (different SRS resources in the same SRS resource set correspond to different orthogonal frequency division multiplexing (OFDM) symbols); and the configuration information is further used to indicate an antenna port identifier of at least one antenna port for sending each of the SRS resources, and a sending beam direction corresponding to each of the at least one antenna port identifier, and different antenna port identifiers correspond to different sending beam directions. For example, spatialrelationinfo information may be included in the configuration information, by means of which the sending beam direction of at least one antenna port identifier of each of the SRS resources may be indicated. In addition to the spatialrelationinfo information, a transmission configuration may further be provided in the configuration information to indicate TCI state information, and specifically, may be an uplink (UL) TCI to indicate sending beam direction information of at least one antenna port identifier of each of the SRS resources.

In an embodiment, a network device may indicate at least one SRS resource set to a terminal by sending configuration information to the terminal, and each of the SRS resource sets contains at least one SRS resource, so that the terminal can send the SRS resource through at least one antenna port. It should be noted that sending an SRS resource in this embodiment and the following embodiments specifically refers to sending an SRS sequence on an SRS time frequency domain resource.

In a 5G new radio (NR) system, based on reciprocity of a channel, a base station can determine downlink channel state information by measuring the SRS sent by the terminal. The SRS resource used by the terminal to send the SRS can be configured by the base station.

Specifically, the base station can send configuration information to the terminal to indicate SRS resource sets to the terminal through the configuration information, where each of the SRS resource sets includes at least one SRS resource, so that the terminal can send the SRS sequence on the SRS time frequency domain resource through an antenna port in the terminal.

In the related art, the base station tacitly approve that the terminal has only one antenna panel to indicate the same sending beam direction for all antenna ports as the sending beam direction for each antenna port to send SRS resources. Due to the fact that the terminal can include a plurality of antenna ports, and an SRS sequence can be sent via different antenna ports, a sending beam direction for sending the SRS sequence indicated to the terminal specifically refers to a sending beam direction for sending the SRS sequence indicated to an antenna port of the terminal.

However, in actual situations, the environment in which different antenna ports are located is different, for example, in the case where the terminal includes a plurality of antenna panels, different antenna ports may be located in different antenna panels, and the sending beam direction most applicable to communicating with the base station may be different with regard to different antenna panels.

For example, with regard to an antenna port A, the sending beam direction most applicable to communicating with the base station is a, but the sending beam direction for sending an SRS resource indicated by the base station for all the antenna ports is b, then the antenna port A will send the SRS resource to the base station according to the sending beam direction b, and then after the base station receives the SRS, the determined downlink channel state information is the downlink channel state information corresponding to the sending beam direction b.

However, the downlink channel state information required to be determined by the base station is generally downlink channel state information of a channel corresponding to the sending beam direction of the antenna port A most applicable (for example, the best signal quality) to communicating with the base station, that is, the downlink channel state information of the channel corresponding to the sending beam direction a, and thus, the same sending beam direction is configured for all the antenna ports to send the SRS resource, resulting in that it is difficult for the base station to accurately determine the downlink channel state information about each beam direction based on the received SRS.

According to an embodiment of the present disclosure, configuration information sent by a network device to a terminal can not only indicate an SRS resource set to the terminal, but also indicate an antenna port identifier of at least one antenna port of each SRS resource in the SRS resource set, and a sending beam direction corresponding to each antenna port identifier, and different antenna port identifiers correspond to different sending beam directions.

It should be noted that an SRS resource can correspond to one antenna port (that is, can be sent via one antenna port), or can correspond to a plurality of antenna ports (further can be sent via a plurality of antenna ports), which can be determined according to the antenna transceiving capability of the terminal.

For example, the antenna transceiving capability is N sending and N receiving, that is, the number of receiving antennas is the same as the number of sending antennas, and then one SRS resource can correspond to N antenna ports, where N is 1, 2, or 4, etc.; for example, the antenna receiving capability is one sending and two receiving, that is, two receiving antennas and one sending antenna are provided in the terminal, and then one SRS resource can correspond to one antenna port; and for example, the antenna receiving capability is two sending and four receiving, that is, four receiving antennas and two sending antennas are provided in the terminal, and then one SRS resource can correspond to two antenna ports.

Due to the fact that this embodiment indicates an antenna port identifier of at least one antenna port for sending each of SRS resources by means of configuration information, and a sending beam direction corresponding to each of at least one antenna port identifier, and different antenna port identifiers correspond to different sending beam directions.

For an SRS resource, even if the SRS resource needs to be sent via a plurality of antenna ports, the sending beam direction for sending the SRS resource via different antenna ports may be different. Accordingly, the above technical solution of the present disclosure facilitate flexibly configuring sending beam directions for different antenna ports to send an SRS resource, and thus facilitate ensuring that a network device accurately determines downlink channel state information on the basis of a received SRS.

FIG. 2 is a schematic flowchart of another SRS configuration method according to an embodiment of the present disclosure. As shown in FIG. 2, before sending configuration information to a terminal, the method further includes:

step S102: setting the number of SRS resources in each of the SRS resource sets, where the number of the SRS resources is proportional to the number of receiving antennas in the terminal and inversely proportional to the number of sending antennas in the terminal.

In an embodiment, a network device may further set the number of SRS resources in each of SRS resource sets, where the setting may be performed according to the number of receiving antennas and sending antennas in a terminal, and specifically, the number of SRS resources can be set to be proportional to the number of receiving antennas in the terminal and inversely proportional to the number of sending antennas in the terminal.

For example, if the number of receiving antennas in the terminal is Rx and the number of sending antennas is Tx, the number of SRS resources in the SRS resource set can be set as k*Rx/Tx, where k is a proportional coefficient and can be set as required.

For example, a terminal includes n (n≥1) antenna panels; taking n=2 as an example, the relationship (e.g., a ratio) between a receiving antenna and a sending antenna on each antenna panel is the same, and the antenna capability of a specific terminal is two sending and four receiving, and then one sending antenna and two receiving antennas are provided on each antenna panel; and due to the fact that there are four receiving antennas, a network device needs to receive four SRS resources to determine downlink channel state information, such as channel state information (CSI), respectively corresponding to the four receiving antennas.

If in this case, different antenna panels can be used for simultaneous sending (specifically uplink sending), that is, two antenna panels each have one sending antenna port, and with regard to the same SRS resource, the two sending antenna ports can be used to send an SRS sequence on the SRS time frequency domain resource, then k=1 can be set, that is, each SRS resource set contains 2/1, i.e., two SRS resources.

For example, two transmitting antenna ports are X and Y respectively, two SRS resources are SRS1 and SRS2 respectively, the SRS1 can be sent at a first time via X and Y, and the SRS2 can be sent at a second time via X and Y, and thus the SRS resources are sent 2×2=4 times in total, so as to ensure that a network device can receive the four SRS resources to accurately determine downlink channel state information respectively corresponding to the four receiving antennas.

Optionally, the number of SRS resources is proportional to the number of antenna panels in the terminal, and the terminal includes a plurality of antenna panels and the plurality of antenna panels cannot be used for simultaneous sending.

In an embodiment, on the basis that the number of SRS resources in the SRS resource set is proportional to the number of receiving antennas in the terminal and is inversely proportional to the number of sending antennas in the terminal, if a plurality of antenna panels in the terminal cannot be used for simultaneous sending, the number of SRS resources can be further set to be proportional to the number of antenna panels in the terminal.

Still taking n=2 as an example, the relationship between a receiving antenna and a sending antenna on each antenna panel is the same, and the specific antenna capability of a specific terminal is two sending and four receiving, and then one sending antenna and two receiving antennas are provided on each antenna panel; and due to the fact that there are four receiving antennas, a network device needs to receive four SRS resources to determine downlink channel state information respectively corresponding to the four receiving antennas.

Due to the fact that different antenna panels cannot be used for simultaneous sending (specifically, uplink sending), that is, two antenna panels each have one sending antenna port, and with regard to the same SRS resource, only one of the two sending antennas can be respectively used to send an SRS sequence in the SRS time frequency and the SRS frequency domain resource, then k can be set to be equal to the number n of antenna panels, n=2, then k*Rx/Tx=2×4/2=4, that is, each SRS resource set contains four SRS resources, and thus the four SRS resources can be sent successively via the two sending antennas.

For example, two transmitting antenna ports are X and Y respectively, and four SRS resources are SRS1, SRS2, SRS3, and SRS4 respectively, the SRS1 can be sent at a first time and the SRS2 can be sent at a second time via X, the SRS3 can be sent at a third time and the SRS4 can be sent at a fourth time via Y, and thus a total of 1×4=4 SRS resources are sent, so as to ensure that a network device can receive the four SRS resources to accurately determine downlink channel state information respectively corresponding to the four receiving antennas.

Optionally, the configuration information includes beam direction indication information used to indicate the sending beam direction, and the beam direction indication information includes a reference signal identifier.

Optionally, the reference signal identifier includes at least one of the following:

a synchronization signal block (SSB) identifier, a non-zero power channel state information reference signal (NZP CSI-RS) identifier, an SRS identifier, and a positioning reference signal (PRS).

In an embodiment, a network device can carry a reference signal identifier in configuration information, and an association relationship between the reference signal identifier and a sending beam direction can be pre-stored in a terminal, so that the sending beam direction can be indicated to the terminal by using the reference signal identifier as beam direction indication information, and after receiving the configuration information, the terminal can query the sending beam direction corresponding to the reference signal identifier in the configuration information according to the association relationship.

Optionally, the beam direction indication information is further used to indicate at least one of the following:

an identifier of a cell (may be a serving cell where the terminal is located, or may be a neighboring cell of the serving cell where the terminal is located) to which a reference signal corresponding to the reference signal identifier belongs;

an identifier of a transmission reception point (TRP for short, for example, may be a transmission reception point of a cell) to which a reference signal corresponding to the reference signal identifier belongs;

an index of an antenna panel to which a reference signal corresponding to the reference signal identifier belongs; and a control resource set pool index (CORESETpool index) of an antenna panel or a transmission reception point to which a reference signal corresponding to the reference signal identifier belongs.

In an embodiment, a network device may configure a terminal with a plurality of reference signal sets, where the reference signal sets may contain a plurality of reference signals, and different reference signal identifiers corresponding to different reference signals in the same reference signal set are different, but there may be the same reference signal identifiers in different reference signal sets. Then, to accurately distinguish the reference signal corresponding to the reference signal identifier, the network device can further indicate the reference signal set identifier of the reference signal corresponding to the reference signal identifier through the beam direction indication information so as to further specifically indicate the terminal.

The reference signal can be related to the cell, and then the network device can further indicate the identifier of the cell through the beam direction indication information, for example, the identifier of the indicated cell is Cell1, and the indicated reference signal identifier is SSB2, and then the terminal can determine the sending beam direction as the beam direction corresponding to the SSB whose reference signal identifier corresponding to Cell1 is SSB2.

The reference signal can further be related to the transmission reception point, and then the network device can further indicate, through the beam direction indication information, an identifier of the transmission reception point to which the reference signal corresponding to the reference signal identifier belongs; the reference signal can further be related to the antenna panel, and then the network device can further indicate, through the beam direction indication information, an index of the antenna panel to which a reference signal corresponding to the reference signal identifier belongs; and the transmission reception point index or the antenna panel index may further be indicated by the control resource set pool index associated therewith, and then the network device may further indicate the index of the control resource set pool of the antenna panel or the transmission reception point through the beam direction indication information.

Figure 3:
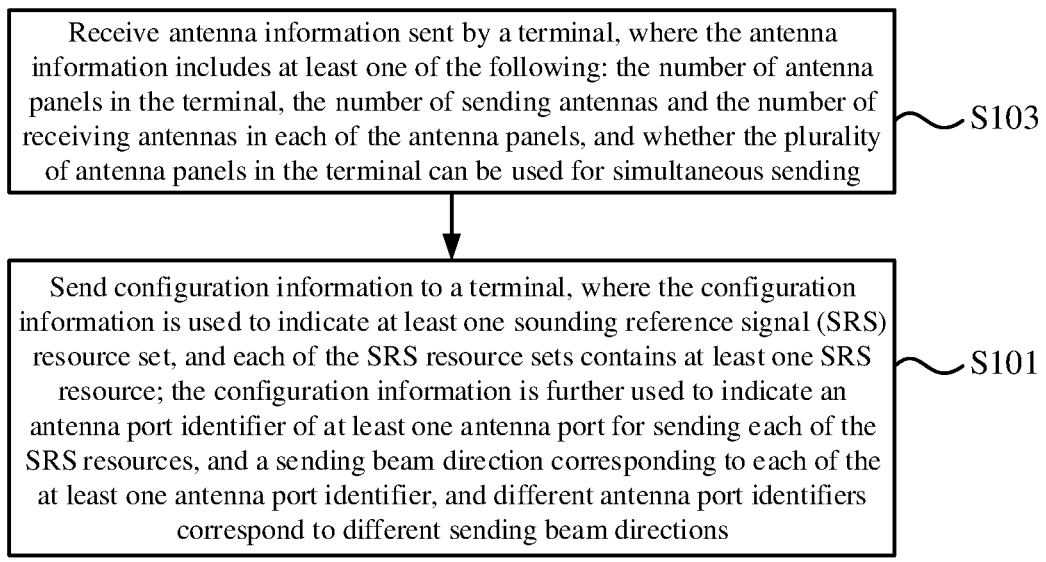
FIG. 3 is a schematic flowchart of yet another SRS resource configuration method according to an embodiment of the present disclosure.

FIG. 3 is a schematic flowchart of yet another SRS configuration method according to an embodiment of the present disclosure. As shown in FIG. 3, before sending configuration information to a terminal, the method further includes:

step S103: receiving antenna information sent by the terminal, where the antenna information includes at least one of the following:

the number of antenna panels in the terminal, the number of sending antennas and the number of receiving antennas in each of the antenna panels, and whether the plurality of antenna panels in the terminal can be used for simultaneous sending.

In an embodiment, a terminal may first send antenna information to a network device, so that the network device may generate configuration information according to the antenna information, for example, the antenna may determine the number of SRS resources in the configured SRS resource set based on the antenna information, and then based on this, the configuration information is generated to indicate the number of SRS resources in the SRS resource set to the terminal.

Specifically, the antenna information includes at least one of the following:

the number of antenna panels in the terminal, the number of sending antennas and the number of receiving antennas in each of the antenna panels, and whether the plurality of antenna panels in the terminal can be used for simultaneous sending.

For example, according to the number of sending antennas and the number of receiving antennas in the antenna panels, the network device sets the number of SRS resources in each of the SRS resource sets, so that the number of the SRS resources is proportional to the number of receiving antennas in the terminal and inversely proportional to the number of sending antennas in the terminal, and then generates configuration information is generated based on the number of SRS resources in the determined SRS resource set.

For example, according to whether the plurality of antenna panels in the terminal can be used for simultaneous sending, the network device can set the number of SRS resources in each of the SRS resource sets, so that the number of the SRS resources is proportional to the number of antenna panels in the terminal, and then generate configuration information based on the number of SRS resources in the determined SRS resource set.

In addition, in the case of only one antenna panel in the terminal, then all the antenna ports in the terminal belong to the same antenna panel, and in this case, all the antenna ports can be selectively configured to send the SRS resources with the same sending beam direction.

And the time interval between different SRS resources configured by the network device may be greater than a pre-set time interval, and the pre-set time interval may be equal to the duration required by the terminal to switch the antenna port, so as to ensure that the terminal has sufficient time to switch the antenna port, to smoothly send the SRS resources.

Figure 4:
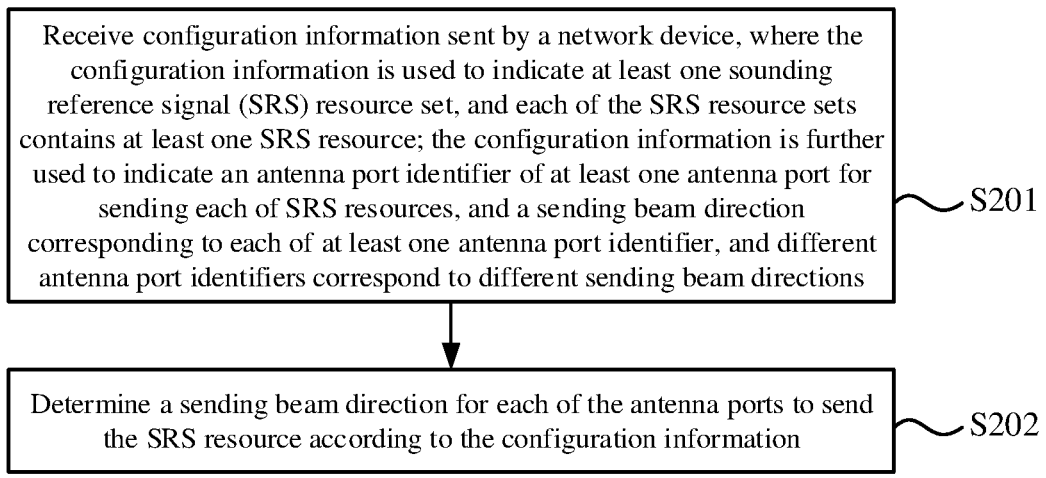
FIG. 4 is a schematic flowchart of an SRS resource determination method according to an embodiment of the present disclosure.

FIG. 4 is a schematic flowchart of an SRS resource determination method according to an embodiment of the present disclosure. The SRS resource determination method shown in this embodiment can be applicable to a terminal, the terminal can communicate with a network device, and the network device can be a 5G base station, a 4G base station, a roadside unit in Internet of Vehicles communication, a vehicle-mounted device terminal, etc. The network device can communicate with a terminal based on a beam scanning manner, and can further communicate with a terminal based on other manners, where the terminal includes, but is not limited to, an electronic device, such as a mobile phone, a tablet computer, a wearable device, an Internet of Things device terminal, an industrial Internet of Things device terminal, and an vehicle-mounted device terminal in Internet of Vehicles communication. At least one antenna panel may be provided in the terminal, and at least one antenna port may be provided on the antenna panel, and the antenna port may be a port of an antenna in a logical concept or a physical antenna in an actual concept.

As shown in FIG. 4, the SRS resource determination method includes:
- step S201: receiving configuration information sent by a network device, where the configuration information is used to indicate at least one sounding reference signal (SRS) resource set, and each of the SRS resource sets contains at least one SRS resource;
- the configuration information is further used to indicate an antenna port identifier of at least one antenna port for sending each of the SRS resources, and a sending beam direction corresponding to each of the at least one antenna port identifier, and different antenna port identifiers correspond to different sending beam directions; and
- step S202: determining a sending beam direction for each of the antenna ports to send the SRS resource according to the configuration information.

In an embodiment, a network device may indicate at least one SRS resource set to a terminal by sending configuration information to the terminal, and each of the SRS resource sets contains at least one SRS resource, so that the terminal can send the SRS resource through an antenna port.

And, configuration information sent by a network device to a terminal can not only indicate an SRS resource set to the terminal, but also send an antenna port identifier of at least one antenna port of each SRS resource in the SRS resource set, and a sending beam direction corresponding to each antenna port identifier, and different antenna port identifiers correspond to different sending beam directions.

This embodiment indicates an antenna port identifier of at least one antenna port for sending each of SRS resources by means of configuration information, and a sending beam direction corresponding to each of at least one antenna port identifier, and different antenna port identifiers correspond to different sending beam directions.

For an SRS resource, even if the SRS resource needs to be sent via a plurality of antenna ports, the sending beam direction for sending the SRS resource via different antenna ports may be different.

Accordingly, the above technical solution of the present disclosure facilitates flexibly configuring sending beam directions for different antenna ports to send an SRS resource, and thus facilitates ensuring that a network device accurately determines downlink channel state information on the basis of a received SRS.

Optionally, the number of the SRS resources is proportional to the number of receiving antennas in the terminal and inversely proportional to the number of sending antennas in the terminal.

Optionally, the terminal includes a plurality of antenna panels and the plurality of antenna panels cannot be used for simultaneous sending, and the number of the SRS resources is proportional to the number of the antenna panels.

Figure 5:
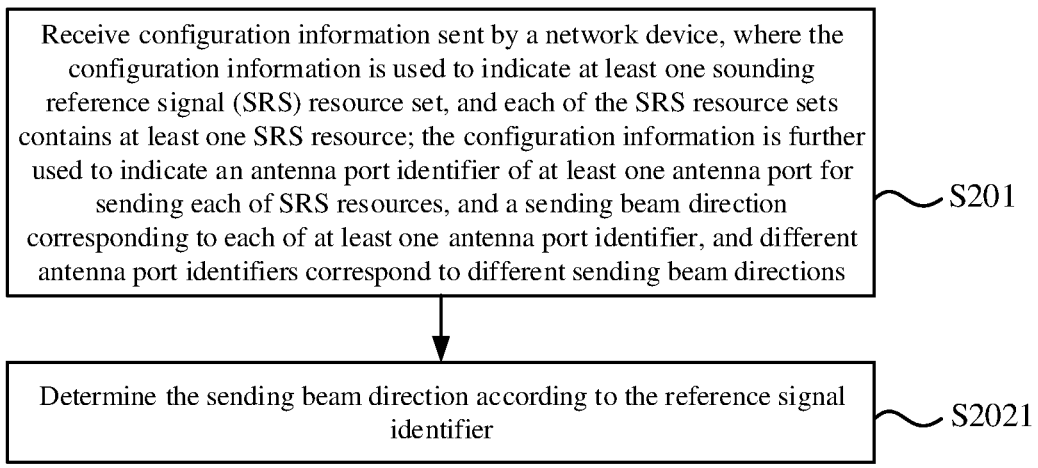
FIG. 5 is a schematic flowchart of another SRS resource determination method according to an embodiment of the present disclosure.

FIG. 5 is a schematic flowchart of another SRS resource determination method according to an embodiment of the present disclosure. As shown in FIG. 5, the configuration information includes beam direction indication information, the beam direction indication information includes a reference signal identifier, and the determining a sending beam direction for each of the antenna ports to send the SRS resource according to the configuration information includes:
- step S2021: determining the sending beam direction according to the reference signal identifier.

Optionally, the reference signal identifier includes at least one of the following:
- a synchronization signal block identifier, a non-zero power channel state information reference signal identifier, an SRS identifier, and a positioning reference signal (PRS) identifier.

In an embodiment, a network device can carry a reference signal identifier in configuration information, and an association relationship between the reference signal identifier and a sending beam direction can be pre-stored in a terminal, so that the sending beam direction can be indicated to the terminal by using the reference signal identifier as beam direction indication information, and after receiving the configuration information, the terminal can query the sending beam direction corresponding to the reference signal identifier in the configuration information according to the association relationship.

Optionally, the determining a sending beam direction for each of the antenna ports to send the SRS resource according to the configuration information further includes:
- determining at least one of the following according to the beam direction indication information:
- an identifier of a cell to which a reference signal corresponding to the reference signal identifier belongs;
- an identifier of a transmission reception point to which a reference signal corresponding to the reference signal identifier belongs;
- an index of an antenna panel to which a reference signal corresponding to the reference signal identifier belongs; and a control resource set pool index of an antenna panel or a transmission reception point to which a reference signal corresponding to the reference signal identifier belongs.

Figure 6:
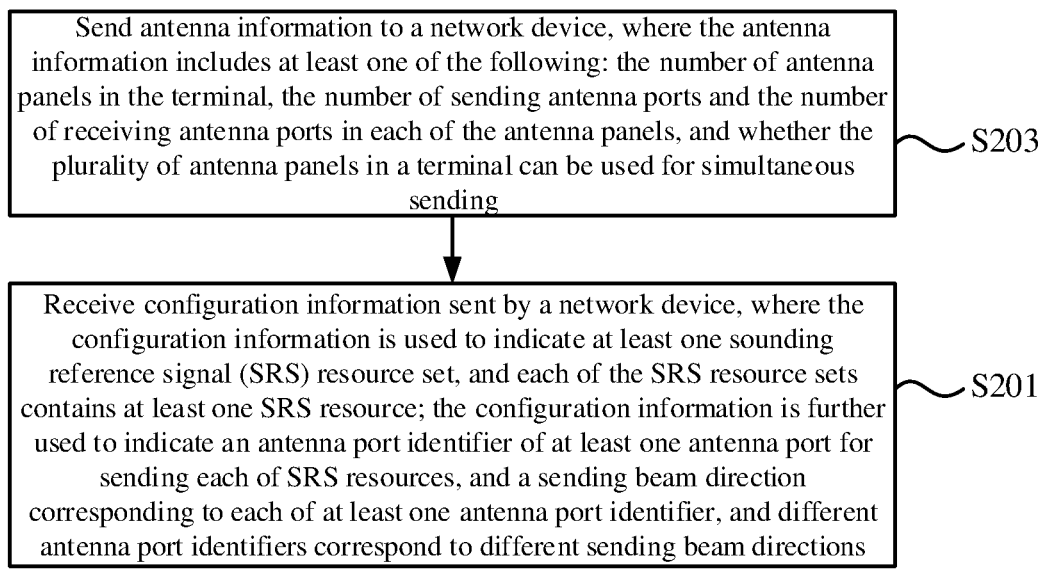
FIG. 6 is a schematic flowchart of yet another SRS resource determination method according to an embodiment of the present disclosure.

FIG. 6 is a schematic flowchart of yet another SRS resource determination method according to an embodiment of the present disclosure. As shown in FIG. 6, before receiving configuration information sent by the network device, the method further includes:

step S203: sending antenna information to the network device, where the antenna information includes at least one of the following:

the number of antenna panels in the terminal, the number of sending antennas and the number of receiving antennas in each of the antenna panels, and whether the plurality of antenna panels in the terminal can be used for simultaneous sending.

In an embodiment, a terminal may first send antenna information to a network device, so that the network device may generate configuration information according to the antenna information, for example, the antenna may determine the number of SRS resources in the configured SRS resource set based on the antenna information, and then the configuration information is generated based on this to indicate the number of SRS resources in the SRS resource set to the terminal.

Specifically, the antenna information includes at least one of the following:

the number of antenna panels in the terminal, the number of sending antennas and the number of receiving antennas in each of the antenna panels, and whether the plurality of antenna panels in the terminal can be used for simultaneous sending.

For example, according to the number of sending antennas and the number of receiving antennas in the antenna panels, the network device sets the number of SRS resources in each of the SRS resource sets, so that the number of the SRS resources is proportional to the number of receiving antennas in the terminal and inversely proportional to the number of sending antennas in the terminal, and then generates configuration information is generated based on the number of SRS resources in the determined SRS resource set.

For example, according to whether the plurality of antenna panels in the terminal can be used for simultaneous sending, the network device can set the number of SRS resources in each of the SRS resource sets, so that the number of the SRS resources is proportional to the number of antenna panels in the terminal, and then generate configuration information based on the number of SRS resources in the determined SRS resource set.

Corresponding to the foregoing embodiments of the SRS resource configuration method and the SRS resource determination method, the present disclosure further provides embodiments of an SRS resource configuration apparatus and an SRS resource determination apparatus.

Figure 7:
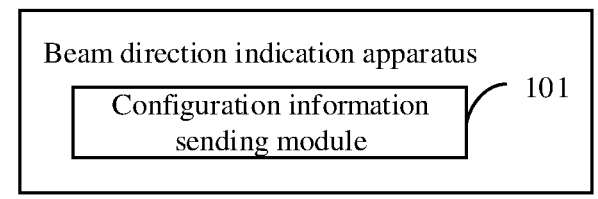
FIG. 7 is a schematic block diagram of an SRS resource configuration apparatus according to an embodiment of the present disclosure.

FIG. 7 is a schematic block diagram of an SRS resource configuration apparatus according to an embodiment of the present disclosure. The SRS resource configuration apparatus shown in this embodiment can be applicable to a network device, and the network device can be a 5G base station, a 4G base station, a roadside unit in Internet of Vehicles communication, a vehicle-mounted device terminal, etc. The network device can communicate with a terminal based on a beam scanning manner, and can further communicate with a terminal based on other manners, where the terminal includes, but is not limited to, an electronic device, such as a mobile phone, a tablet computer, a wearable device, an Internet of Things device terminal, an industrial Internet of Things device terminal, and an vehicle-mounted device terminal in Internet of Vehicles communication. At least one antenna panel may be provided in the terminal, and at least one antenna port may be provided on the antenna panel, and the antenna port may be a port of an antenna in a logical concept or a physical antenna in an actual concept.

As shown in FIG. 7, the SRS resource configuration apparatus may include:

a configuration information sending module 101, configured to send configuration information to a terminal, where the configuration information is used to indicate at least one sounding reference signal (SRS) resource set, and each of the SRS resource sets contains at least one SRS resource;

the configuration information is further used to indicate an antenna port identifier of at least one antenna port for sending each of the SRS resources, and a sending beam direction corresponding to each of the at least one antenna port identifier, and different antenna port identifiers correspond to different sending beam directions.

Figure 8:
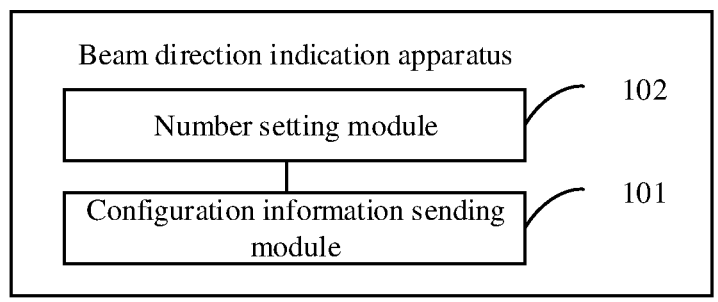
FIG. 8 is a schematic block diagram of another SRS resource configuration apparatus according to an embodiment of the present disclosure.

FIG. 8 is a schematic block diagram of another SRS resource configuration apparatus according to an embodiment of the present disclosure. As shown in FIG. 8, the apparatus further includes:

a number setting module 102, configured to set the number of SRS resources in each of the SRS resource sets, where the number of the SRS resources is proportional to the number of receiving antennas in the terminal and inversely proportional to the number of sending antennas in the terminal.

Optionally, the number of SRS resources is proportional to the number of antenna panels in the terminal, and the terminal includes a plurality of antenna panels and the plurality of antenna panels cannot be used for simultaneous sending.

Optionally, the configuration information includes beam direction indication information used to indicate the sending beam direction, and the beam direction indication information includes a reference signal identifier.

Optionally, the reference signal identifier includes at least one of the following:

a synchronization signal block identifier, a non-zero power channel state information reference signal identifier, an SRS identifier, and a positioning reference signal (PRS) identifier.

Optionally, the beam direction indication information is further used to indicate at least one of the following:

an identifier of a cell to which a reference signal corresponding to the reference signal identifier belongs;

an identifier of a transmission reception point to which a reference signal corresponding to the reference signal identifier belongs;

an index of an antenna panel to which a reference signal corresponding to the reference signal identifier belongs; and a control resource set pool index of an antenna panel or a transmission reception point to which a reference signal corresponding to the reference signal identifier belongs.

Figure 9:
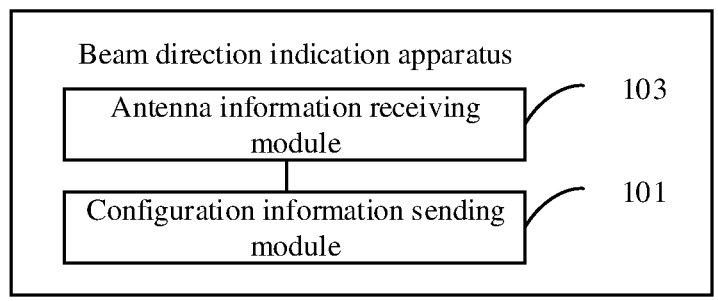
FIG. 9 is a schematic block diagram of yet another SRS resource configuration apparatus according to an embodiment of the present disclosure.

FIG. 9 is a schematic block diagram of yet another SRS resource configuration apparatus according to an embodiment of the present disclosure. As shown in FIG. 9, the apparatus further includes:

an antenna information receiving module 103, configured to receive antenna information sent by the terminal, where the antenna information includes at least one of the following:

the number of antenna panels in the terminal, the number of sending antennas and the number of receiving antennas in each of the antenna panels, and whether the plurality of antenna panels in the terminal can be used for simultaneous sending.

Figure 10:
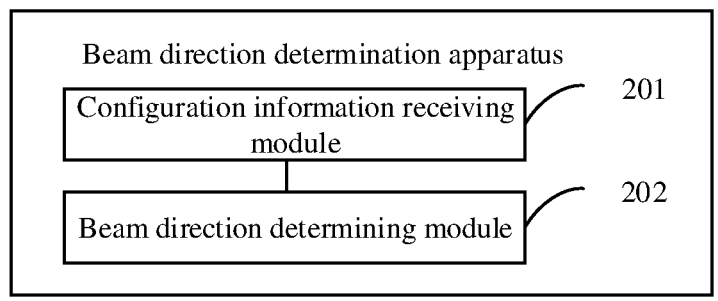
FIG. 10 is a schematic block diagram of an SRS resource determination apparatus according to an embodiment of the present disclosure.

FIG. 10 is a schematic block diagram of an SRS resource determination apparatus according to an embodiment of the present disclosure. The SRS resource determination apparatus shown in this embodiment can be applicable to a terminal, the terminal can communicate with a network device, and the network device can be a 5G base station, a 4G base station, a roadside unit in Internet of Vehicles communication, a vehicle-mounted device terminal, etc. The network device can communicate with a terminal based on a beam scanning manner, and can further communicate with a terminal based on other manners, where the terminal includes, but is not limited to, an electronic device, such as a mobile phone, a tablet computer, a wearable device, an Internet of Things device terminal, an industrial Internet of Things device terminal, and an vehicle-mounted device terminal in Internet of Vehicles communication. At least one antenna panel may be provided in the terminal, and at least one antenna port may be provided on the antenna panel, and the antenna port may be a port of an antenna in a logical concept or a physical antenna in an actual concept.

As shown in FIG. 10, the SRS resource determination apparatus includes:

a configuration information receiving module 201, configured to receive configuration information sent by a network device, where the configuration information is used to indicate at least one sounding reference signal (SRS) resource set, and each of the SRS resource sets contains at least one SRS resource;

the configuration information is further used to indicate an antenna port identifier of at least one antenna port for sending each of the SRS resources, and a sending beam direction corresponding to each of the at least one antenna port identifier, and different antenna port identifiers correspond to different sending beam directions; and a beam direction determining module 202, configured to determine a sending beam direction for each of the antenna ports to send the SRS resource according to the configuration information.

Optionally, the number of the SRS resources is proportional to the number of receiving antennas in the terminal and inversely proportional to the number of sending antennas in the terminal.

Optionally, the terminal includes a plurality of antenna panels and the plurality of antenna panels cannot be used for simultaneous sending, and the number of the SRS resources is proportional to the number of the antenna panels.

Optionally, the configuration information includes beam direction indication information, where the beam direction indication information includes a reference signal identifier, and the beam direction determining module is configured to determine the sending beam direction according to the reference signal identifier.

Optionally, the reference signal identifier includes at least one of the following:

a synchronization signal block identifier, a non-zero power channel state information reference signal identifier, an SRS identifier, and a positioning reference signal (PRS) identifier.

Optionally, the determining a sending beam direction for each of the antenna ports to send the SRS resource according to the configuration information further includes:

determining at least one of the following according to the beam direction indication information:
an identifier of a cell to which a reference signal corresponding to the reference signal identifier belongs;
an identifier of a transmission reception point to which a reference signal corresponding to the reference signal identifier belongs;
an index of an antenna panel to which a reference signal corresponding to the reference signal identifier belongs; and
a control resource set pool index of an antenna panel or a transmission reception point to which a reference signal corresponding to the reference signal identifier belongs.

Figure 11:
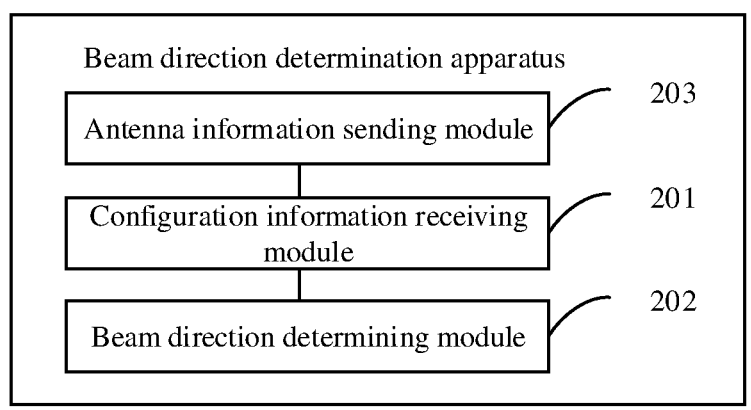
FIG. 11 is a schematic block diagram of another SRS resource determination apparatus according to an embodiment of the present disclosure.

FIG. 11 is a schematic block diagram of another SRS resource determination apparatus according to an embodiment of the present disclosure. As shown in FIG. 11, the apparatus further includes:

an antenna information sending module 203, configured to send antenna information to the network device, where the antenna information includes at least one of the following:
the number of antenna panels in the terminal, the number of sending antennas and the number of receiving antennas in each of the antenna panels, and whether the plurality of antenna panels in the terminal can be used for simultaneous sending.

With regard to the apparatuses in the above embodiments, the specific manners that the respective modules perform operations have been described in detail in the embodiments relating to the methods, and detailed descriptions will not be given here.

The apparatus embodiments substantially correspond to the method embodiments, so reference may be made to the descriptions of the method embodiments. The apparatus embodiments described above are merely schematic, the modules illustrated as separate components may be or may not be physically separated, and the components displayed as modules may be or may not be physical modules, that is, the components may be positioned at one place or may further be distributed on a plurality of network modules. Some or all of the modules may be selected according to actual needs to achieve the objectives of the solutions of the embodiments. Those of ordinary skill in the art can understand and implement without any creative effort.

The present disclosure further provides an electronic device, including:
a processor; and
a memory for storing processor-executable instructions,
where the processor is configured to implement the SRS resource configuration method according to any one of the foregoing embodiments.

The present disclosure further provides an electronic device, including:
a processor; and
a memory for storing processor-executable instructions,
where the processor is configured to implement the SRS resource determination method according to any of the foregoing embodiments.

The present disclosure further provides a computer-readable storage medium storing a computer program, and when the program is executed by a processor, the steps of the SRS resource configuration method in any of the foregoing embodiments are implemented.

The present disclosure further provides a computer-readable storage medium storing a computer program, and when the program is executed by a processor, the steps of the SRS resource determination method in any of the foregoing embodiments are implemented.

Figure 12:
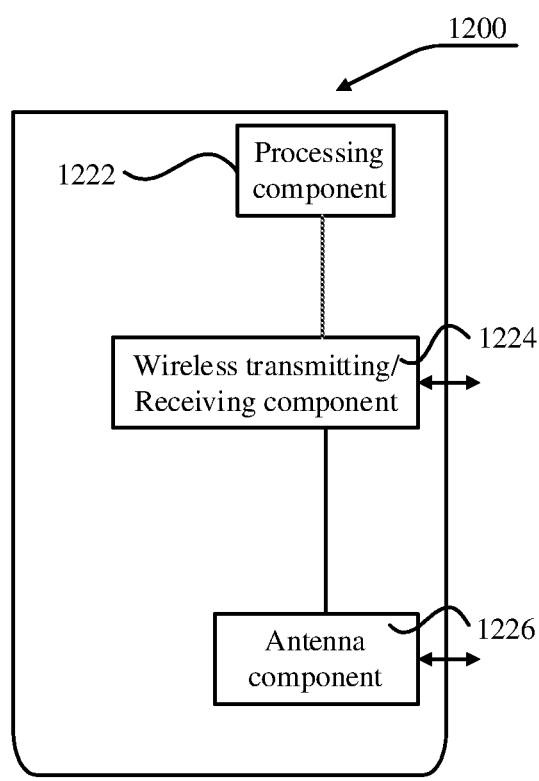
FIG. 12 is a schematic diagram of an apparatus for SRS resource configuration according to an embodiment of the present disclosure.

As shown in FIG. 12, FIG. 12 is a schematic diagram of an apparatus 1200 for SRS resource configuration according to an embodiment of the present disclosure. The apparatus 1200 may be provided as a base station. Referring to FIG. 12, the apparatus 1200 includes a processing component 1222, a wireless transmitting/receiving component 1224, an antenna component 1226, and a signal processing part specific to a wireless interface. The processing component 1222 may further include one or more processors. One of the processors in the processing component 1222 may be configured to implement the SRS resource configuration method according to any one of the foregoing embodiments.

Figure 13:
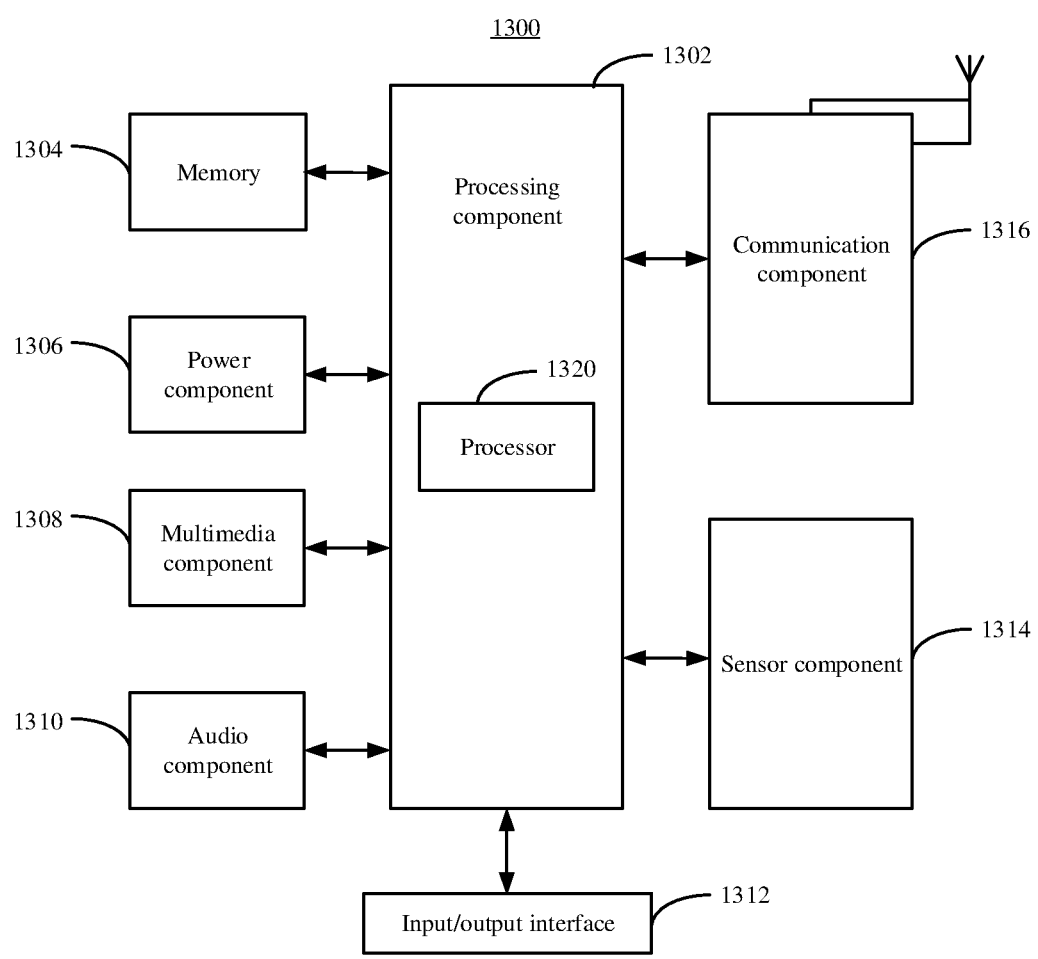
FIG. 13 is a schematic diagram of an apparatus for SRS resource determination according to an embodiment of the present disclosure.

FIG. 13 is a schematic diagram of an apparatus 1300 for SRS resource determination according to an embodiment of the present disclosure. For example, the apparatus 1300 may be a mobile phone, a computer, a digital broadcasting terminal, a messaging device, a game console, a tablet device, a medical device, a fitness device, a personal digital assistant, etc.

Referring to FIG. 13, the apparatus 1300 may include one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 usually controls the overall operations of an apparatus 1300, such as operations associated with display, telephone call, data communication, camera operation and recording operation. The processing component 1302 may include one or more processors 1320 to execute instructions to complete all of or part of the steps of the above SRS resource determination method. In addition, the processing component 1302 may include one or more modules to facilitate the interaction between the processing component 1302 and other components. For example, the processing component 1302 may include a multimedia module to facilitate interaction between the multimedia component 1308 and the processing component 1302.

The memory 1304 is configured to store various types of data to support operations at the apparatus 1300. Examples of these data include instructions for any application or method operated on the apparatus 1300, contact data, phone book data, messages, pictures, videos, etc. The memory 1304 may be implemented by any type of volatile or non-volatile storage device or a combination thereof, such as a static random access memory (SRAM), an electrically erasable programmable read-only memory (EEPROM), an erasable. programmable read-only memory (EPROM), a programmable read-only memory (PROM), a read-only memory (ROM), a magnetic memory, a flash memory, a magnetic disk or an optical disk.

The power component 1306 provides power for various components of the apparatus 1300. The power component 1306 may include a power management system, one or more power sources, and other components associated with power generation, management and distribution of the apparatus 1300.

The multimedia component 1308 includes a screen for providing an output interface between the apparatus 1300 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, slides and gestures on the touch panel. The touch sensor may sense not only the boundary of the touch or slide, but also the duration and pressure associated with the touch or slide. In some embodiments, the multimedia component 1308 includes a front camera and/or a rear camera. When the apparatus 1300 is in an operation mode, such as a shooting mode or a video mode, the front camera and/or the rear camera can receive external multimedia data. Each front or rear camera may be a fixed optical lens system or have focal length and optical zoom capability.

The audio component 1310 is configured to output and/or input audio signals. For example, the audio component 1310 includes a microphone (MIC), and when the apparatus 1300 is in an operation mode, such as a call mode, a recording mode, and a voice recognition mode, the microphone is configured to receive external audio signals. The received audio signals may be further stored in the memory 1304 or sent by the communication component 1316. In some embodiments, the audio component 1310 further includes a speaker for outputting audio signals.

The I/O interface 1312 provides an interface between the processing component 1302 and a peripheral interface module. The peripheral interface module may be a keyboard, a click wheel, buttons, etc. The button may include but is not limited to a home button, a volume button, a start button and a lock button.

The sensor component 1314 includes one or more sensors for providing various aspects of status assessment for the apparatus 1300. For example, the sensor component 1314 may detect the on/off state of the apparatus 1300, and relative positions of components such as a display and a keypad of the apparatus 1300. The sensor component 1314 may further detect a position change of the apparatus 1300 or one component of the apparatus 1300, presence or absence of contact between the user and the apparatus 1300, an orientation or acceleration/deceleration of the apparatus 1300 and a temperature change of the apparatus 1300. The sensor component 1314 may include a proximity sensor configured to detect the presence of nearby objects without any physical contact. The sensor component 1314 may further include an optical sensor, such as a CMOS or CCD image sensor, for use in imaging applications. In some embodiments, the sensor component 1314 may further include an acceleration sensor, a gyroscope sensor, a magnetic sensor, a pressure sensor or a temperature sensor.

The communication component 1316 is configured to facilitate wired or wireless communication between the apparatus 1300 and other devices. The apparatus 1300 may access wireless networks based on communication standards, such as Wi-Fi, 2G, 3G, 4G LTE, 5G NR, or a combination thereof. In an example, the communication component 1316 receives broadcast signals or broadcast associated information from an external broadcast management system via a broadcast channel. In an example, the communication component 1316 further includes a near field communication (NFC) module to facilitate short-range communication. For example, the NFC module may be implemented based on radio frequency identification (RFID) technology, infrared data association (IrDA) technology, ultra wide band (UWB) technology, Bluetooth (BT) technology, and other technologies.

In an example, the apparatus 1300 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components to perform the above SRS resource determination method.

In an example, a non-transitory computer-readable storage medium including instructions is further provided, such as a memory 1304 including instructions executable by the processor 1320 of the apparatus 1300 to complete the above SRS resource determination method. For example, the non-transitory computer-readable storage medium may be an ROM, a random access memory (RAM), a CD-ROM, a magnetic tape, a floppy disk, an optical data storage device, etc.

Those skilled in the art would readily conceive of other embodiments of the present disclosure after considering the specification and practicing the disclosure herein. The present disclosure is intended to cover any variations, uses or adaptive changes of the present disclosure. These variations, uses or adaptive changes follow the general principle of the present disclosure and include common general knowledge or conventional technical means in the technical field that are not disclosed in the present disclosure. The description and the embodiments are merely regarded as exemplary, and the real scope and spirit of the present disclosure are pointed out by the following claims.

It should be understood that the present disclosure is not limited to the precise structure described above and shown in the drawings, and various modifications and changes can be made without departing from its scope. The scope of the present disclosure is only limited by the appended claims.

It should be noted that the relational terms herein such as first and second are used only to differentiate an entity or operation from another entity or operation, and do not require or imply any actual relationship or sequence between these entities or operations. The terms "include", "comprise", or any variants thereof are intended to cover a non-exclusive inclusion, so that a process, method, article, or device that includes a series of elements not only includes those elements, but also includes other elements not listed explicitly, or includes inherent elements of the process, method, article, or device. In the absence of more limitations, an element defined by "include a . . . " does not exclude other same elements existing in the process, method, article, or device including the element.

The methods and apparatuses provided by the embodiments of the present disclosure are described in detail above. Specific embodiments are used herein to illustrate the principles and implementations of the present disclosure. The descriptions of the above embodiments are only used to help understanding the method and core idea of the present disclosure. In addition, changes may be made to the specific embodiments and the application scope according to the idea of the present disclosure for a person skilled in the art. To sum up, the content of the specification should not be understood as limitations to the present disclosure.

The invention claimed is:

1. A sounding reference signal (SRS) resource configuration method, performed by a network device, the SRS resource configuration method comprising:
sending configuration information to a terminal, wherein the configuration information is used to indicate at least one SRS resource set, and one SRS resource set contains at least one SRS resource;
wherein a number of the SRS resources contained by one SRS resource set is proportional to a number of receiving antennas in the terminal and inversely proportional to a number of sending antennas in the terminal; and
wherein the configuration information is further used to indicate an antenna port identifier of at least one antenna port for sending the at least one SRS resource, and a sending beam direction corresponding to the antenna port identifier, and different antenna port identifiers correspond to different sending beam directions.

2. The SRS resource configuration method according to claim 1, wherein the number of receiving antennas in the terminal is Rx, the number of sending antennas in the terminal is Tx, the number of the SRS resources contained by one SRS resource set being set as k*Rx/Tx, where the k is a proportional coefficient.

3. The SRS resource configuration method according to claim 2, wherein the number of SRS resources is proportional to a number of antenna panels in the terminal, and the terminal comprises a plurality of antenna panels and the plurality of antenna panels cannot be used for simultaneous sending.

4. The SRS resource configuration method according to claim 1, wherein the configuration information comprises beam direction indication information, the beam direction indication information is used to indicate the sending beam direction, and the beam direction indication information comprises a reference signal identifier.

5. The SRS resource configuration method according to claim 4, wherein the reference signal identifier comprises at least one of the following:
a synchronization signal block identifier, a non-zero power channel state information reference signal identifier, an SRS identifier, and a positioning reference signal (PRS) identifier.

6. The SRS resource configuration method according to claim 5, wherein the beam direction indication information is further used to indicate at least one of the following:
an identifier of a cell to which a reference signal corresponding to the reference signal identifier belongs;
an identifier of a transmission reception point to which a reference signal corresponding to the reference signal identifier belongs;
an index of an antenna panel to which a reference signal corresponding to the reference signal identifier belongs; and
a control resource set pool index of an antenna panel or a transmission reception point to which a reference signal corresponding to the reference signal identifier belongs.

7. The SRS resource configuration method according to claim 1, wherein before sending configuration information to the terminal, the SRS resource configuration method further comprises:
receiving antenna information sent by the terminal, wherein the antenna information comprises at least one of the following:
a number of antenna panels in the terminal, a number of sending antennas and a number of receiving antennas in one antenna panel, and whether a plurality of antenna panels in the terminal can be used for simultaneous sending.

8. A non-transitory computer-readable storage medium storing a computer program, wherein when the computer program is executed by a processor, steps of the SRS resource configuration method according to claim 1 are implemented.

9. A sounding reference signal (SRS) resource determination method, performed by a terminal comprising at least one antenna port, the SRS resource determination method comprising:

receiving configuration information sent by a network device, wherein the configuration information is used to indicate at least one SRS resource set, and one SRS resource set contains at least one SRS resource;

wherein a number of the SRS resources contained by one SRS resource set is proportional to a number of receiving antennas in the terminal and inversely proportional to a number of sending antennas in the terminal; and wherein the configuration information is further used to indicate an antenna port identifier of at least one antenna port for sending the at least one SRS resource, and a sending beam direction corresponding to the antenna port identifier, and different antenna port identifiers correspond to different sending beam directions; and determining a sending beam direction for one antenna port to send the at least one SRS resource according to the configuration information.

10. The SRS resource determination method according to claim 9, wherein the number of receiving antennas in the terminal is Rx, the number of sending antennas in the terminal is Tx, the number of the SRS resources contained by one SRS resource set being set as k*Rx/Tx, where the k is a proportional coefficient.

11. The SRS resource determination method according to claim 10, wherein the terminal comprises a plurality of antenna panels and the plurality of antenna panels cannot be used for simultaneous sending, and the number of the at least one SRS resource is proportional to a number of the antenna panels.

12. The SRS resource determination method according to claim 9, wherein the configuration information comprises beam direction indication information, the beam direction indication information comprises a reference signal identifier, and the determining a sending beam direction for one antenna port to send the SRS resource according to the configuration information comprises:

determining the sending beam direction according to the reference signal identifier.

13. The SRS resource determination method according to claim 12, wherein the reference signal identifier comprises at least one of the following:

a synchronization signal block identifier, a non-zero power channel state information reference signal identifier, an SRS identifier, and a positioning reference signal (PRS) identifier.

14. The SRS resource determination method according to claim 13, wherein the determining a sending beam direction for one antenna port to send the SRS resource according to the configuration information further comprises:

determining at least one of the following according to the beam direction indication information:

an identifier of a cell to which a reference signal corresponding to the reference signal identifier belongs;

an identifier of a transmission reception point to which a reference signal corresponding to the reference signal identifier belongs;

an index of an antenna panel to which a reference signal corresponding to the reference signal identifier belongs; and a control resource set pool index of an antenna panel or a transmission reception point to which a reference signal corresponding to the reference signal identifier belongs.

15. The SRS resource determination method according to claim 9, wherein before receiving configuration information sent by the network device, the SRS resource determination method further comprises:

sending antenna information to the network device, wherein the antenna information comprises at least one of the following:

a number of antenna panels in the terminal, a number of sending antennas and a number of receiving antennas in one antenna panel, and whether a plurality of antenna panels in the terminal can be used for simultaneous sending.

16. An electronic device, comprising:

a processor; and a memory for storing processor-executable instructions, wherein when the processor-executable instructions are executed by the processor, the processor is configured to implement the SRS resource determination method according to claim 9.

17. A non-transitory computer-readable storage medium storing a computer program, wherein when the computer program is executed by a processor, steps of the SRS resource determination method according to claim 9 are implemented.

18. An electronic device, comprising:

a processor; and a memory for storing processor-executable instructions, wherein the processor is configured to execute the processor-executable instructions to:

send configuration information to a terminal, the configuration information is used to indicate at least one sounding reference signal (SRS) resource set, and a SRS resource set contains at least one SRS resource;

wherein a number of the SRS resources contained by one SRS resource set is proportional to a number of receiving antennas in the terminal and inversely proportional to a number of sending antennas in the terminal; and wherein the configuration information is further used to indicate an antenna port identifier of at least one antenna port for sending the at least one SRS resource, and a sending beam direction corresponding to the antenna port identifier, and different antenna port identifiers correspond to different sending beam directions.

19. The electronic device according to claim 18, wherein the number of receiving antennas in the terminal is Rx, the number of sending antennas in the terminal is Tx, the number of the SRS resources contained by one SRS resource set being set as k*Rx/Tx, where the k is a proportional coefficient.

20. The electronic device according to claim 19, wherein the number of the at least one SRS resource is proportional to a number of antenna panels in the terminal, and the terminal comprises a plurality of antenna panels and the plurality of antenna panels cannot be used for simultaneous sending.

* * * * *